May 19, 1942.  W. R. COLLINGS ET AL  2,283,539
METHOD FOR THE MANUFACTURE OF SOLID POLYMERS OF VINYL AROMATIC COMPOUNDS
Filed May 16, 1939
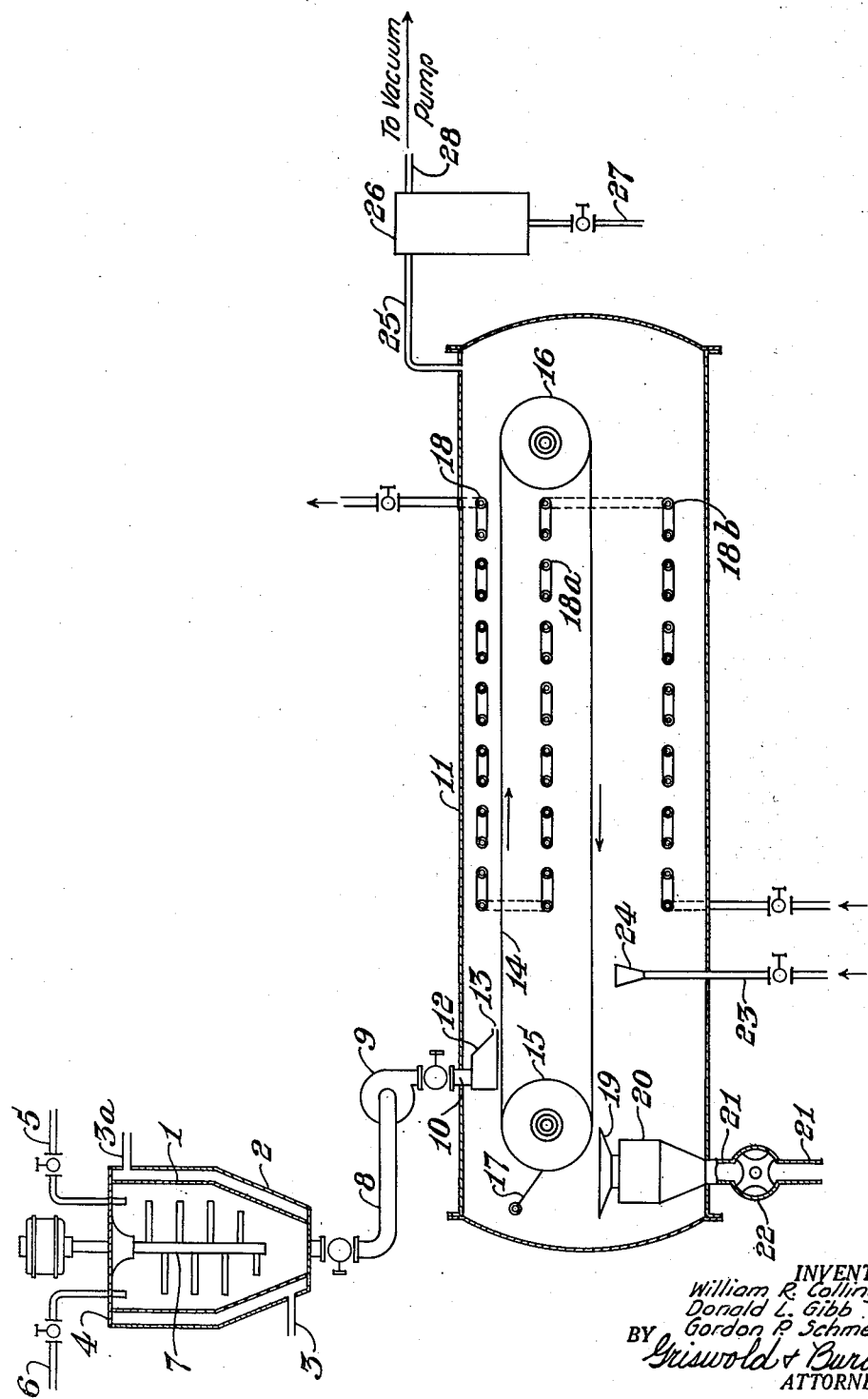
INVENTORS
William R. Collings
Donald L. Gibb
Gordon P. Schmelter
BY Griswold & Burdick
ATTORNEYS.

Patented May 19, 1942

2,283,539

UNITED STATES PATENT OFFICE 2,283,539

METHOD FOR THE MANUFACTURE OF SOLID POLYMERS OF VINYL AROMATIC COMPOUNDS

William R. Collings, Donald L. Gibb, and Gordon P. Schmelter, Midland, Mich., assignors to The Dow Chemical Company, Midland, Mich., a corporation of Michigan Application May 16, 1939, Serial No. 274,042

11 Claims. (Cl. 260—91)

This invention concerns an improved method for the manufacture of solid polymers of vinyl aromatic compounds, particularly styrene.

It is well known that styrene and its homologues polymerize very slowly at room temperature, but quite rapidly at elevated temperatures and that the properties of the resinous polymers are influenced greatly by the temperature at which the polymerization is carried out. For instance, the polymers formed at temperatures below about 170° C. are generally tough resinous products suitable for a wide variety of purposes, e. g. the preparation of molded articles, of lacquers, etc., whereas the polymers formed at higher temperatures are more brittle and are of more limited utility. In general, the molecular weight and the toughness of such polymer becomes greater as the temperature at which it is formed is lowered. Temperatures between 70° and 170° C. are usually employed in the polymerization.

The polymerization of styrene has heretofore been carried out both in the presence and in the absence of diluents such as benzene, toluene, ethylbenzene, etc. The presence of such diluent reduces the danger of local overheating within the mass and renders easier the production of polystyrene of uniform quality. However, the use of the diluent is disadvantageous in other respects. For instance, the presence of a large proportion of diluent is known to reduce markedly the rate of polymerization and also the molecular weight of the polymer. Furthermore, complete removal of the diluent from the polymerized product has heretofore been a difficult and expensive operation. In this respect it may be mentioned that the retention of even a small proportion of solvent frequently alters to considerable extent the physical properties of the polymer and causes it to blush on standing. For these reasons, the polymerization is usually carried out in the absence of diluents.

However, the production of a uniform grade of polystyrene by heating pure styrene in the absence of solvents is difficult when operating on a commercial scale, since the polymerization reaction is strongly exothermic and the viscous partially polymerized mass is a very poor conductor of heat. Accordingly, the heat generated tends to remain stored within the mass where it further accelerates the reaction and causes formation of undesired types of polymers due to local over-heating. Naturally, these difficulties become more pronounced as the scale of production is increased, since it is far more difficult to remove heat from a large batch of material, and maintain the latter at an even temperature throughout, than from a small batch. In general, they become serious difficulties when attempting to polymerize styrene in batches of one gallon size or larger.

Furthermore, even though the polymerization is carried out in the absence of added solvents, it never goes to completion, i. e. the product always contains a small proportion of unpolymerized styrene. The latter modifies the properties of the polymer and may cause it to blush. Accordingly, it usually is necessary to pulverize the polymer and remove the unpolymerized material in order to obtain a product of uniform and satisfactory quality. These extra steps are inconvenient, add to the cost of the product, and are liable to result in contamination of the product.

An object of this invention is to provide a continuous method for the production of polystyrene and related products, whereby the polymerization may be carried out at a controlled temperature and be completed in a reasonable time, and whereby unpolymerized material is removed continuously to yield a substantially pure polymer of uniform quality. Other objects will be apparent from the following description of the invention.

We have found that by first heating styrene to a temperature at which it polymerizes at a satisfactory rate and thereafter gradually or periodically adding a solvent in amount sufficient to dilute the mixture so that it may be stirred, over-heating within the mixture may be avoided and the polymerization may be carried out quite rapidly to obtain a uniform product. We have further found that after completing the polymerization to the extent desired, the solvent and unpolymerized styrene may conveniently be removed in continuous manner from the mixture by feeding the latter onto a moving belt, or similar device, located within a heated vacuum chamber so that the mixture forms a layer on one face of the belt and the volatile components of the mixture are quickly vaporized at the temperature and pressure employed to leave a deposit of substantially pure polystyrene on the belt. In carrying out this operation, however, we find that it is necessary to cool the purified polystyrene in order to remove it readily from the belt. This cooling step may most conveniently be carried out by spraying the polystyrene-laden belt with a volatile non-solvent cooling fluid such as water at a point in the belt's travel beyond that at which the organic diluents have been vaporized from the polystyrene, but preceding somewhat that at which the belt undergoes flexing by passage over a pulley or the like. By properly locating the point at which the spraying is done, the cooling fluid may be vaporized completely from the polymer prior to removing the latter from the belt so that the product is obtained directly in purified and dry condition.

The accompanying drawing gives a diagrammatic cross-sectional view of one form of apparatus suitable for use in practicing the invention. In the drawing, the numeral 1 designates a polymerizing chamber provided with a jacket 2 through which a heating or cooling fluid may be passed via inlet 3 and outlet 3a, respectively. The chamber is provided with a cap 4 having inlets 5 and 6 for styrene and a diluent, respectively, passing therethrough. A mechanical stirrer 7 also passes through and is suspended from the cap 4. A conduit 8 leads from the bottom of chamber 1 to a pump 9, which is provided with a valved line 10 that passes through the wall of a vacuum oven 11 and connects with an extrusion shoe 12 located inside of the oven. The shoe 12 is located directly over a metal belt 14 and is provided with a slot 13 through which material may be extruded onto the outer face of the belt. Within oven 11 are heating devices 18, 18a, and 18b which may be steam radiators, as shown, or any other usual type of heating elements. Oven 11 is also provided with a vapor outlet 25 which leads to a condenser 26. The condenser is provided with a drain 27 and a vapor line 28 which leads to a vacuum pump, not shown. The belt 14 is located entirely within oven 11 and is supported by and passes over pulleys 15 and 16. Belt 14 is actuated by usual means not shown. A cooling-fluid inlet 23 passes through the lower wall of oven 11 and terminates in a spray nozzle 24 which is situated so as to direct a stream of fluid against belt 14 at a point preceding passage of the belt over pulley 15. The nozzle 24 is directed against belt 14 at a position sufficiently removed from pulley 15 so that cooling fluid applied to the belt may be evaporated prior to passage of the belt over the pulley. A blade or bar 17 is held near and parallel to the face of pulley 15 in such position as to prevent material which breaks loose from the surface of the belt during its passage over the pulley from being carried further on the belt. A hopper 19 is located within oven 11 at a point below pulley 15 and blade 17 so as to receive material broken from the belt and direct it into a grinding machine 20 which is actuated by means not shown. An outlet 21 from the lower portion of grinder 20 is provided with a discharge lock 22, or other suitable device for discharging the product while maintaining a vacuum within oven 11.

In producing polystyrene with the equipment just described, the polymerizing chamber 1 is charged with styrene, which preferably is of 90 per cent purity or higher, and the chamber is heated to a temperature above 70° C., preferably between 80° and 140° C., by passing a heated fluid such as water, steam, or diphenyloxide, etc., through the jacket 2. The styrene is stirred during heating so as to hold it at an even temperature throughout and maintain it as nearly at the temperature of the fluid in jacket 2 as possible.

As the polymerization progresses, the mixture thickens and becomes too viscous for ready stirring when only from 40 to 60 per cent of the styrene is polymerized. If desired, the polymerization may be discontinued prior to this point and the unreacted styrene be recovered in a later stage of the process. We find it more economical, however, to add gradually, as the reaction progresses, an inert solvent in an amount sufficient to maintain the mixture in the form of a mobile, readily stirred, liquid. The solvent employed may be benzene, toluene, xylene, ethylbenzene, ethylene chloride, or any other inert solvent capable of dissolving polystyrene. It should, of course, be sufficiently volatile so that it may be evaporated from the polystyrene product. By carrying the polymerization out in this manner, we may readily polymerize from 95 to 99 per cent of the styrene and obtain it in concentrations up to 70 per cent by weight.

After completing the polymerization, the solution is passed, while hot and mobile, through line 8, pump 9, and line 10 into the extrusion shoe 12 from which it is extruded as a layer on the moving belt 14, located inside of the vacuum oven 11. The oven is heated, usually at temperatures between 100° and 200° C., by means of the radiators 18, 18a, and 18b. It is maintained at sub-atmospheric pressure, suitably at an absolute pressure between 1 and 300 millimeters, and preferably at an absolute pressure between 5 and 25 millimeters of mercury, by withdrawing gases and vapors therefrom through vapor outlet 25, condenser 26, and line 28 leading to a vacuum pump.

The solvent and unreacted styrene evaporate soon after applying the polystyrene solution to belt 14, leaving the polystyrene as a sponge-like plastic mass which adheres tightly to the belt. The belt carries this residual polystyrene through a spray of water or other non-solvent cooling fluid, e. g. aqueous alcohol, or low boiling petroleum fractions (preferably of boiling point below 100° C.) injected into the oven through conduit 23 and nozzle 24. The polystyrene is thereby cooled and rendered sufficiently brittle so that it may be broken from the belt by flexing the latter. During travel of the belt from the spray of cooling fluid to the belt pulley 15, the fluid is evaporated to leave the polystyrene substantially dry. The belt, in passing over pulley 15, is flexed sufficiently to break the polystyrene from its surface in the form of irregular porous slabs. The bar 17 is held close to the face of the pulley to prevent possibility of these slabs beng carried further by the belt. The use of such bar is precautionary only and the machine can be operated successfully without it.

The polystyrene broken from the belt surface drops into hopper 19 and thence into the grinding device 20 where it is reduced to a powder. The powdered product passes from the grinder through conduit 21 and discharge lock 22 into drums or other suitable containers.

The method and apparatus hereinbefore described may be modified without departure from the principle of the invention. For instance, instead of using a single polymerizing chamber, as indicated in the drawing, a bank of such chambers may advantageously be used so as to supply a continuous feed of polystyrene solution to the vacuum oven 11. Also, instead of using a belt as the polymer-carrying device within such oven, a rotating drum cooled at one point and provided with a scraper blade for removing the product, may be used instead. When colored or plasticized polystyrene is desired as the product, a substantially non-volatile coloring agent or plasticizing agent may be added to the polystyrene solution prior to introducing the latter into the vacuum oven. As the coloring agent to be employed in such manner, any inert and non-volatile dye or pigment, e. g. monophenylfluorindine, mesoanthramine, titanium oxide, chromic oxide, etc., may be used. Likewise a wide variety of plasticizing agents, e. g. dibutyl phthalate, pentachlorinated diphenyl, tricresyl phosphate, etc., are known which may be employed. The plasticizer is usually employed in a proportion not exceeding 20 per cent of the weight of the polystyrene in order to avoid undue softening or weakening of the latter, but it may be used in larger proportions, if desired.

The invention, as herein described, is not limited to the production of polystyrene, but may also be applied in manufacturing the solid polymers of other vinyl aromatic compounds such as divinyl benzene, para-ethyl styrene, ortho-ethyl styrene, meta-chloro styrene, para-chloro styrene, ortho-methyl styrene, etc.

Other modes of applying the principle of the invention may be employed instead of those explained, change being made as regards the method or apparatus herein disclosed, provided the steps or apparatus stated by any of the following claims or the equivalent of such stated steps or apparatus be employed.

We therefore particularly point out and distinctly claim as our invention:

1. In a method for the manufacture of a solid polymer of a vinyl aromatic compound from the monomeric vinyl aromatic compound, the steps of heating the vinyl aromatic compound to form a liquid solution of its polymer, applying the solution as a layer on a solid surface, heating the layer at subatmospheric pressure to vaporize the solvent therefrom, cooling the residual polymer to reduce its plasticity, removing the polymer as porous slabs from the surface, and pulverizing the porous slabs.

2. A continuous method for the manufacture of a solid polymer of vinyl aromatic compounds from a monomeric vinyl aromatic compound which comprises heating the vinyl aromatic compound to polymerize the same while gradually adding an inert volatile solvent in amount sufficient to maintain the mixture in liquid condition at the polymerization temperature, applying the resultant solution as a layer on a moving metal surface, heating the layer at subatmospheric pressure to vaporize the solvent therefrom, cooling the residual polymer to reduce its plasticity, and removing the polymer from the metal surface.

3. A continuous method for the manufacture of solid polystyrene, from liquid styrene which comprises heating styrene to polymerize the same while gradually adding an inert volatile solvent in amount sufficient to maintain the mixture in liquid condition at the polymerization temperature, applying the resultant polystyrene solution as a layer on a moving metal surface located within a heating zone at subatmospheric pressure, whereby the layer is heated at subatmospheric pressure sufficiently to vaporize the solvent therefrom, cooling the residual polystyrene to reduce its plasticity, and removing the polystyrene from the metal surface.

4. In a continuous method for the manufacture of solid polystyrene from liquid styrene, the steps of heating styrene to form a viscous polystyrene solution, extruding the solution as a layer on a moving metal surface located within a heating zone at subatmospheric pressure, whereby the layer is heated at subatmospheric pressure sufficiently to vaporize the solvent therefrom, passing the surface having the residual polystyrene deposited thereon through a spray of a volatile non-solvent for said polymer to cool and reduce the plasticity of the polystyrene, maintaining the cooled polystyrene under subatmospheric pressure for a time sufficient to vaporize the non-solvent therefrom, and then removing the polystyrene from the metal surface.

5. In a method for the manufacture of solid polystyrene, the steps of applying a solution of polystyrene in an organic solvent as a layer on a moving metal surface, heating the layer at subatmospheric pressure to a temperature between 100° and 200° C to vaporize the solvent therefrom, applying to the residual polystyrene while at said pressure a volatile non-solvent fluid to cool and reduce the plasticity of the polystyrene, and then removing the polymer from the surface.

6. In a method wherein a solution of polystyrene is applied as a layer on a moving surface and the solvent is evaporated therefrom at an elevated temperature, the steps of cooling the residual deposit of polystyrene by spraying water thereon, evaporating the water to leave the polystyrene substantially dry and then flexing the surface to break the polystyrene deposit therefrom.

7. In a method for the manufacture of a solid polymer of a vinyl aromatic compound in colored form, the steps of applying a solution of the polymer in an organic solvent, which solution contains a substantially non-volatile coloring agent, as a layer on a moving surface located within a heating zone at subatmospheric pressure, whereby the layer is heated at subatmospheric pressure sufficiently to vaporize the solvent therefrom, cooling the residual colored polymer to reduce its plasticity by spraying it while under sub-atmospheric pressure with a volatile non-solvent for the polymer, and removing the polymer from the surface.

8. In a method for the manufacture of a plasticized solid polymer of a vinyl aromatic compound, the steps of applying a solution of said polymer and a substantially non-volatile plasticizer therefor in an organic solvent as a layer on a moving surface located within a heating zone at subatmospheric pressure, whereby the layer is heated at subatmospheric pressure sufficiently to vaporize the solvent therefrom, cooling the residual plasticized polymer to reduce its plasticity by spraying it while under sub-atmospheric pressure with a volatile non-solvent for the polymer, and removing the polymer from the surface.

9. In a method for the manufacture of a solid polymer of a vinyl aromatic compound of at least 90 per cent concentration with stirring to a polymerization temperature above 70° C., the steps of heating a vinyl aromatic compound to polymerize the same and during the polymerization gradually adding an inert volatile solvent in amount sufficient to maintain the mixture in liquid condition at the polymerization temperature.

10. In a method for the manufacture of solid polystyrene, the steps of heating styrene of at least 90 per cent concentration with stirring to a temperature between 80° and 140° C. to polymerize the same and during the polymerization gradually adding an inert volatile solvent in amount sufficient to maintain the mixture in liquid condition at the polymerization temperature.

11. In a method for the manufacture of a solid polymer of a vinyl aromatic compound, the steps of applying a solution of said polymer in an organic solvent as a layer on a moving surface located within a heating zone at subatmospheric pressure, whereby the layer is heated at subatmospheric pressure sufficiently to vaporize the solvent therefrom, causing the surface having the residual polymer deposited thereon to travel through a spray of volatile liquid non-solvent to cool and reduce the plasticity of the polymer, maintaining the polymer at subatmospheric pressure for a time sufficient to vaporize the liquid non-solvent therefrom, removing the residual polymer as porous slabs from said moving surface, and grinding the slabs to a powder.

WILLIAM R. COLLINGS.
DONALD L. GIBB.
GORDON P. SCHMELTER.